United States Patent
Dong

(10) Patent No.: US 9,634,453 B2
(45) Date of Patent: Apr. 25, 2017

(54) ACTIVE OPTICAL ISOLATORS AND ACTIVE OPTICAL CIRCULATORS

(71) Applicant: Alcatel-Lucent USA Inc., Murray Hill, NJ (US)

(72) Inventor: Po Dong, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/571,416

(22) Filed: Dec. 16, 2014

(65) Prior Publication Data

US 2016/0164239 A1    Jun. 9, 2016

Related U.S. Application Data

(60) Provisional application No. 62/088,595, filed on Dec. 6, 2014.

(51) Int. Cl.
| | |
|---|---|
| *H01S 3/00* | (2006.01) |
| *G02F 1/01* | (2006.01) |
| *G02F 1/225* | (2006.01) |
| *G02B 6/42* | (2006.01) |
| *G02F 1/21* | (2006.01) |

(52) U.S. Cl.
CPC .......... *H01S 3/0064* (2013.01); *G02B 6/4208* (2013.01); *G02F 1/0121* (2013.01); *G02F 1/225* (2013.01); *G02F 1/2255* (2013.01); *H01S 3/0085* (2013.01); *G02F 2001/212* (2013.01)

(58) Field of Classification Search
CPC .... H01S 3/0064; H01S 3/0085; G02F 1/0121; G02F 1/225; G02F 1/2255
See application file for complete search history.

(56) References Cited

U.S. PATENT DOCUMENTS

| | | | | |
|---|---|---|---|---|
| 5,177,634 | A * | 1/1993 | Way | H01S 3/06758 359/337 |
| 7,228,023 | B1 * | 6/2007 | Jones | G02B 6/12 385/14 |
| 8,768,110 | B2 * | 7/2014 | Doerr | G02F 1/21 359/237 |
| 2010/0329288 | A1 * | 12/2010 | Kitabayashi | H01S 3/2308 372/6 |
| 2012/0308175 | A1 * | 12/2012 | Doerr | G02F 1/21 385/14 |
| 2013/0209022 | A1 * | 8/2013 | Doerr | G02F 1/011 385/3 |

(Continued)

OTHER PUBLICATIONS

Lira et al. "Electrically driven Nonreciprocity by Interband Photonic Transition on a Silicon Chip", Physical Review Letters, vol. 109, pp. 033901-1-033901-5, published (Jul. 16, 2012.*

(Continued)

*Primary Examiner* — Eric Bolda
(74) *Attorney, Agent, or Firm* — John F. McCabe

(57) ABSTRACT

An apparatus includes a controllable optical interferometer having first and second external optical ports and a traveling-wave modulation electrode. The apparatus also includes an electrical driver configured and connected to apply a voltage with a periodic modulation to the traveling-wave modulation electrode such that the controllable optical interferometer operates as an optical isolator over a wavelength range.

22 Claims, 7 Drawing Sheets

(56) References Cited

U.S. PATENT DOCUMENTS

| | | | |
|---|---|---|---|
| 2014/0049810 A1* | 2/2014 | McComb | H01S 3/2333 359/341.1 |
| 2014/0153860 A1 | 6/2014 | Prosyk | |
| 2014/0334764 A1* | 11/2014 | Galland | G02F 1/225 385/3 |

OTHER PUBLICATIONS

Bhandare et al., "Novel Nonmagnetic 30-dB Traveling-Wave Single-Sideband Optical Isolator Integrated in III/V Material", IEEE Journal of Selected Topics in Quantum Electronics, vol. 11, No. 2, Mar./Apr. 2005, pp. 417-421.*

Shimizu, H. et al., "Fabrication and Characterization of an InGaAsp/InP Active Waveguide Optical Isolator with 14.7 dB/mm TE Mode Nonreciprocal Attenuation", J. Lightwave Technol., 24(1), 2006, pp. 38-43.

Jalas, D. et al., "What is—and what is not—an optical isolator", Nature Photonics, vol. 7, Aug. 2013, pp. 579-582.

Van Parys, W. et al., "Transverse Magnetic Mode Nonreciprocal Propagation in an Amplifying Al Ga In As/InP Optical Waveguide Isolator", Appl. Phys. Lett., 88(7), 2006, pp. 071115-1 to 071115-3.

Shoji, Y. et al., "Magneto-optical isolator with silicon waveguides fabricated by direct bonding", Appl. Phys. Lett. 92(7), 2008, pp. 071117-1 to 071117-3.

Zaman, T. R. et al., "Semiconductor Waveguide Isolators", J. Lightwave Technol., 26(2), 2008, pp. 291-301.

Bi, L. et al., "On-chip optical isolation in monolithically integrated non-reciprocal optical resonators", Nature Photonics, 5(12), 2011, pp. 758-762.

Tien, M. C. et al., "Silicon ring isolators with bonded nonreciprocal magneto-optic garnets", Optics Express, 19 (12), 2011, pp. 11740-11745.

Shoji, Y. et al., "Magneto-optical non-reciprocal devices in silicon photonics", Sci. Technol. Adv. Materials, (15(1), Jan. 7, 2014, 014602 (10 pgs.).

Bi, L. et al., "Magneto-Optical Thin Films for On-Chip Monolithic Integration of Non-Reciprocal Photonic Devices", Materials 6(11), 2013, pp. 5094-5117.

Ghosh, S. et al., "Ce:YIG/Silicon-on-Insulator waveguide optical isolator realized by adhesive bonding", Optics Express, 20(2), 2012, pp. 1839-1848.

Krause, M. et al., "Measurement of Nonreciprocal Stimulated Raman Scattering in Silicon Photonic Wires", Proceedings of 2012 IEEE 9th International Conference on Group IV Photonices (GFP), San Diego, 2012, WA2, pp. 6-8.

Fan, L. et al., "An All-Silicon Passive Optical Diode", Science, vol. 335, 2012, pp. 447-450.

Fan, L. et al., "Silicon optical diode with 40 dB nonreciprocal transmission", Optics Lett. 38(8), 2013, pp. 1259-1261.

Bhandare, S. et al., "Novel Nonmagnetic 30-dB Traveling-Wave Single-Sideband Optical Isolator Integrated in III/V Material", IEEE J. Selected Topics in Quantum Electronics, 11(2), 2005, pp. 417-421.

Yu, Z. et al., "Complete optical isolation created by indirect interband photonic transitions", Nature Photonics, 3(2), 2009, pp. 91-94 and Corrigendum.

Lira, H. et al., "Electrically Driven Nonreciprocity Induced by Interband Photonic Transition on a Silicon Chip", Phys. Rev. Lett., 109(3), 2012, 033901-1 to 033901-5.

Doerr, C. R. et al., "Optical isolator using two tandem phase modulators", Optics Lett., 36(21), 2011, pp. 4293-4295.

Doerr, C. R. et al., "Silicon photonics broadband modulation-based isolator", Optics Express, 22(4), Feb. 20, 2014, pp. 4493-4498.

Yang, Y. et al., "Experimental demonstration of broadband Lorentz non-reciprocity in an integrable photonic architecture based on Mach-Zehnder modulators", Opt. Express, 22, Jul. 14, 2014, pp. 17409-17422.

Dong, P. et al., "Inducing Photonic Transitions between Discrete Modes in a Silicon Optical Microcavity", Phys. Rev. Lett., vol. 100, 2008, pp. 033904-1 to 033904-4.

Fang, K. et al., " Realizing effective magnetic field for photons by controlling the phase of dynamic modulation", Nature Photonics, 6(11), 2012, pp. 782-787.

Li, E. et al., "Photonic Aharonov-Bohm effect in photon-phonon interactions", Nature Commun., 5, Jan. 20, 2014, 3225, pp. 1-5.

Dong, P. et al., High-speed low-voltage single-drive push-pull silicon Mach-Zehnder modulators:, Optics Express, 20, 2012, pp. 6163-6169.

Saleh, B. et al., Fundamentals of Photonics, Wiley Series in Pure and Applied Optics, (John Wiley, 1991), Chapter 6, pp. 193-237.

Hwang, J. et al., "Electro-tunable optical diode based on photonic bandgap liquid-crystal heterojunctions", Nature. Materials, 4(5), 2005, pp. 383-387.

Yang, Yisu et al., "Experimental demonstration of broadband Lorentz non-reciprocity in an integrable photonic architecture based on Mach-Zehnder modulators", Optics Express, vol. 22, No. 14, Jul. 14, 1014, pp. 17409-17422.

Ibrahim, S. K. et al., "Non-magnetic 30 dB integrated optical isolator in III/V material", Electronics Letters, vol. 40, No. 20, Sep. 30, 2004, 2 pgs.

PCT International Search Report, PCT/US2015/063091, International Fling Date Dec. 1, 2015, Date of Mailing Mar. 8, 2016, 6 pgs.

* cited by examiner

50 ↘

```
APPLY A VOLTAGE WITH A PERIODIC MODULATION TO
TRAVELING-WAVE MODULATION ELECTRODE(S) OF AN
OPTICAL INTERFEROMETER HAVING FIRST AND
SECOND EXTERNAL OPTICAL PORTS TO CONFIGURE
THE CONTROLLABLE OPTICAL INTERFEROMETER TO    — 52
SUBSTANTIALLY BLOCK LIGHT RECEIVED AT THE
SECOND EXTERNAL OPTICAL PORT FROM BEING
OUTPUT BY THE OPTICAL INTERFEROMETER AT THE
FIRST EXTERNAL OPTICAL PORT
```

```
OPTIONALLY RECEIVE LIGHT AT THE SECOND EXTERNAL  — 54
OPTICAL PORT WHILE PERFORMING THE APPLYING
```

```
OPTIONALLY RECEIVE LIGHT AT THE FIRST OPTICAL PORT  — 56
WHILE PERFORMING THE APPLYING STEP
```

*FIG. 5*

ACTIVE OPTICAL ISOLATORS AND ACTIVE OPTICAL CIRCULATORS

This application claims the benefit of provisional application 62/088,595, filed on Dec. 6, 2014.

BACKGROUND

Technical Field

The inventions relate to optical isolators and optical circulators, methods of using optical isolators and optical circulators, and apparatus including optical isolators and optical circulators.

Related Art

This section introduces aspects that may be help to facilitate a better understanding of the inventions. Accordingly, the statements of this section are to be read in this light and are not to be understood as admissions about what is prior art or what is not prior art.

An optical isolator is an optical component having two optical ports, which allows light to pass through the two optical ports in one direction and blocks light from passing through the two optical ports in the opposite direction. In particular, an optical isolator provides a much higher attenuation for light passing through the two optical ports in one direction than for light passing through the two optical ports in the opposite direction.

Optical isolators are believed to not satisfy Lorentz reciprocity. Some optical isolators do not satisfy Lorentz reciprocity due to the incorporation of magneto-optical material(s) therein. Magneto-optical materials typically break Lorentz reciprocity due to the presence of an asymmetric magnetic permeability.

Optical isolators have important uses in contemporary optical systems. For example, an optical isolator may be used to protect a laser or an optical amplifier from optical feedback. In the absence of an optical isolator, such optical feedback may occur due to external light received at the optical output of the laser or optical amplifier. As an example, the receipt of external light in a laser having distributed optical feedback may destabilize the output optical wavelength of the laser. The addition of an optical isolator to the optical output of the laser can remove or attenuate such unwanted optical feedback.

SUMMARY

Herein, some embodiments of active optical isolators violate Lorentz reciprocity due to a time-varying modulation of optical refractive index(es) on internal optical waveguide(s) thereof during operation. In such active optical isolators, a controllable optical interferometer, which is a type of optical modulator, may be operated as an optical isolator. In particular, the controllable optical interferometer can be operated with a time-varying electrical drive signal so that light passing there through in opposite directions is attenuated very differently. Some such active optical isolators may be easier to incorporate into integrated optical devices because of a lack of magneto-optical materials in optical portions thereof.

In some embodiments, an apparatus includes a controllable optical interferometer having first and second external optical ports and a traveling-wave modulation electrode. The apparatus also includes an electrical driver configured and connected to apply a voltage with a periodic modulation to the traveling-wave modulation electrode such that the optical interferometer operates as an optical isolator over a wavelength range.

In some of the above embodiments of an apparatus, the optical interferometer may include a Mach-Zehnder optical interferometer and/or an optical loop interferometer.

In any of the above embodiments of an apparatus, the electrical driver may be configured to operate the controllable optical interferometer such that, in a wavelength range, light input to the second external optical port is substantially blocked by the optical interferometer from being output at the first external optical port.

In any of the above embodiments of an apparatus, the electrical driver may be configured to operate the controllable optical interferometer such that, in the wavelength range, light input to the first external optical port is substantially passed by the controllable optical interferometer to be output at the first external optical port.

In any of the above embodiments of an apparatus, the voltage may be a square wave voltage.

In any of the above embodiments of an apparatus, the apparatus may further include a laser having distributed optical feedback. In such embodiments, the controllable optical interferometer may be connected to receive light from the laser via one of the external optical ports and may be connected to function as an optical isolator for the laser.

In any of the above embodiments of an apparatus, the apparatus may further include an optical amplifier. In such embodiments, the controllable optical interferometer may be connected to receive light from the optical amplifier via one of the external optical ports and may be connected to function as an optical isolator for the optical amplifier.

In any of the above embodiments of an apparatus, the controllable optical interferometer may include serially cascaded controllable optical interferometers, wherein each of the controllable optical interferometers has a traveling-wave modulation electrode. In such embodiments, the electrical driver may also be configured to apply a voltage with a periodic modulation to the traveling-wave modulation electrodes in parallel.

In any of the above embodiments of an apparatus, the controllable optical interferometer may have a third external optical port, and the voltage may be configured to operate the controllable optical interferometer as an optical circulator with the first, second and third external optical ports.

In any of the above embodiments of an apparatus, the controllable optical interferometer may be an integrated optical device.

In another embodiment, a method includes applying a voltage having a periodic modulation to a traveling-wave modulation electrode of a controllable optical interferometer with first and second external optical ports. The applying configures the controllable optical interferometer to substantially block light received at the second external optical port from being output by the optical interferometer at the first external optical port.

In some embodiments of the method, the applying a voltage may also configure the controllable optical interferometer to cause light received at the first external optical port to be substantially output by the controllable optical interferometer at the second external optical port.

In any of the above embodiments of a method, the voltage may have a square wave modulation to the traveling-wave modulation electrode.

In any of the above embodiments of a method, the applying may produce a current wave on a segment of the traveling-wave modulation electrode light that co-propagates with part of the light received at the second external optical port in a coupling region such that the light received at the second external optical port is substantially blocked from being output at the first external optical port.

In any of the above embodiments of a method, the optical interferometer may be a Mach-Zehnder optical interferometer or an optical loop interferometer.

In any of the above embodiments of a method, the method may further include receiving light from a laser or optical amplifier at the first external optical port while performing the applying.

In any of the above embodiments of a method, the applying a voltage configures the controllable optical interferometer to function as a 3-port optical circulator.

BRIEF DESCRIPTION OF THE DRAWINGS

FIG. 5 is flow chart schematically illustrating a method of operating a controllable optical interferometer as an active optical isolator, e.g., to operate the controllable optical interferometers of FIGS. 1 and 2;

In the Figures and text like or similar reference numbers indicate functionally and/or structurally similar elements.

In the Figures, the relative dimensions of some features may be exaggerated to more clearly illustrate apparatus therein.

Herein, various embodiments are described more fully by the Drawings and the Detailed Description of Illustrative Embodiments. Nevertheless, the inventions may be embodied in various forms and are not limited to the specific embodiments illustrated in the Figures and/or described in the Detailed Description of the Illustrative Embodiments.

DETAILED DESCRIPTION OF ILLUSTRATIVE EMBODIMENTS

Herein, various embodiments include active optical isolators that may be configured to operate at wavelengths in the C, L, and/or S optical telecommunications bands or may be configured to operate at wavelengths in the ultraviolet, visible, or mid-infrared regions. Some such embodiments may include one or more optical isolators that are able to operate over a broad wavelength range, e.g., a range including a plurality of adjacent dense or coarse wavelength division multiplexed (WDM) optical channels.

Figure 1:
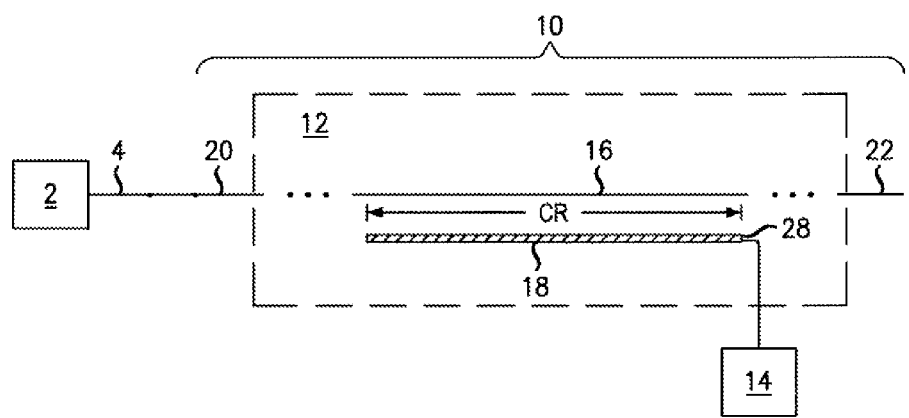
FIG. 1 is a block diagram schematically illustrating an optical interferometer-based embodiment of an active optical isolator.

FIG. 1 schematically illustrates an active optical isolator 10 that includes a controllable optical interferometer 12 and an alternating current (AC) electrical driver 14. The controllable optical interferometer 12 has first and second external optical ports 20, 22, which are also the external optical ports of the active optical isolator 10.

The controllable optical interferometer 12 includes an internal optical waveguide 16 and a traveling-wave modulation electrode 18. The internal optical waveguide 16 forms a segment of an optical path connecting the first and second external optical ports 20, 22. In the controllable optical interferometer 12, the first and second external optical ports 20, 22 may also be optically connected by one or more other optical paths (not shown), which are parallel to the internal optical waveguide 16. The traveling-wave modulation electrode 18 has a segment that extends along and is located near to a corresponding segment of the internal optical waveguide 16 in a coupling region (CR).

In the coupling region CR, the traveling-wave modulation electrode 18 and the segment of the optical waveguide 16 function as an electro-optical phase shifter. In particular, the optical core and/or optical cladding of the internal optical waveguide 16 may include an electro-optically responsive material. For example, the electro-optically responsive material may be or include lithium niobate, one or more group III-V semiconductors, and/or one or more group II-VI semiconductors. Due to the presence of the electro-optically responsive material, electric fields of electrical current waves propagating on segment(s) of the traveling-wave modulation electrode 18 can produce a modulation of the optical properties of laterally adjacent and nearby segment(s) of the internal optical waveguide 16 thereby causing modulation of light therein. The modulation generates waves of refractive index value(s) corresponding to the adjacent and nearby electrical current waves propagating on the traveling-wave modulation electrode 18. For this reason, the modulation accumulated while the light propagates through the coupling region CR can depend on the propagation direction of said light with respect to the propagation direction of the electrical current waves on the traveling-wave modulation electrode 18.

The AC electrical driver 14 is configured to produce an alternating voltage, e.g., at radio frequencies (RF), and is electrically connected to apply the alternating voltage to one end 28 of the traveling-wave modulation electrode 18 or to a part of the traveling-wave modulation electrode 18 near the end 28 such that electrical current waves propagate there along. The AC electrical driver 14 may connect to the traveling wave electrode 18 physically, e.g., via a conducting wire or lead or via a capacitive coupler. As already stated, the electrical current waves produce a modulation of light propagating in the portion of the internal optical waveguide 16, which is located in the coupling region CR. The modulation of the light depends on the light's propagation direction in the coupling region CR, which depends on the light's propagation direction with respect to the first and second external optical ports 20, 22. Due to this directionally dependent modulation, the controllable optical interferometer 12 substantially blocks light, which is received at the second external optical port 22, from being output at the first external optical port 20. Due to this directionally dependent modulation, the controllable optical interferometer 12 also substantially passes light, which is received at the first external optical port 20, to be output at the second external optical port 22. That is, light that is received at the first external optical port 20 undergoes much less attenuation in the controllable optical interferometer 13 than light that is received at the second external optical port 22 and thus, propagates in the opposite direction in the controllable optical interferometer 12. Also, in the controllable optical interferometer 12, light propagating from the first external optical port 20 towards the second external optical port 22 typically accumulates a substantially time-independent intensity modulation, i.e., as further discussed below.

In the active optical modulator 10, the controllable optical interferometer 12 may be any conventional optical interferometer with a traveling wave modulation electrode. For example, the optical interferometer 12 may be a Mach-Zehnder optical modulator, which has a parallel pair of internal optical waveguides, a controllable optical loop interferometer type of optical modulator, or an optical interferometer type of optical modulator having N parallel internal optical waveguides where N is an integer greater than 2.

As illustrated in FIG. 1, an external active optical component 2 may also be present in some embodiments of optical systems. The external active optical component 2 may be, e.g., a laser, an optical amplifier, or another optically pumped device. The external active optical component 2 has an output optical port 4, which connects to the active optical isolator 10 via the first external optical port 20 thereof. In such embodiments, the active optical isolator 10 may be configured to substantially optically isolate the optical component 2 from external optical feedback via the output optical port 4.

Figure 2:
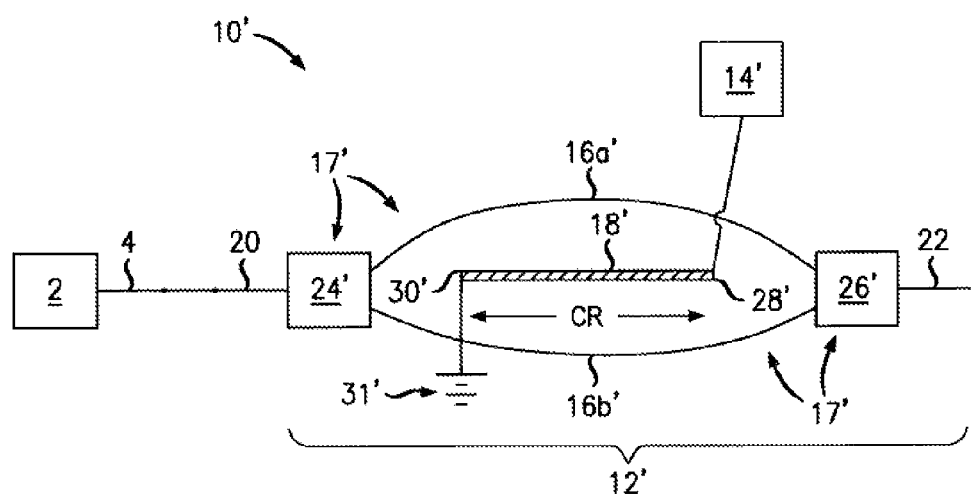
FIG. 2 is a block diagram schematically illustrating an embodiment of the active optical isolator of FIG. 1, which includes a Mach-Zehnder optical modulator (MZ-OM)

FIG. 2 schematically illustrates a specific embodiment 10' of the active optical isolator 10 of FIG. 1. The active optical isolator 10' includes a Mach-Zehnder optical modulator (MZ-OM) 12' and an AC electrical driver 14', e.g., an RF signal generator. The MZ-OM 12' includes an optical waveguide circuit 17' and one or more traveling-wave modulation electrodes 18'. The AC electrical driver 14' is configured and connected to generate electrical current waves that propagate on the one or more traveling-wave modulation electrodes 18' in one direction.

The optical circuit 17' includes a 1×2 optical power splitter 24'; two internal optical waveguides 16a', 16b'; and a 2×1 optical power combiner 26'. Each of the internal optical waveguides 16a', 16b' optically connects a corresponding one of the optical outputs of the 1×2 optical power splitter 24' to a corresponding one of the optical inputs of the 2×1 optical power combiner 26'. Each of the internal optical waveguides 16a', 16b' may include planar optical waveguide and/or an optical fiber segments. The optical input of the 1×2 optical power splitter 24' is the first external optical port 20 of the active optical isolator 10', and optical output of the 2×1 optical power combiner 26' is the second external optical port 22 of the active optical isolator 10'. The 1×2 optical power splitter 24' and the 2×1 optical power combiner 26' may be, e.g., conventional 3 decibel (dB) 1×2 optical power splitters that can, e.g., split optical power, which is received at their optical input about equally between the two optical outputs. The 1×2 optical power splitter 24' and the 2×1 optical power combiner 26' may be, e.g., conventional 2×2 optical power couplers in which one optical port is not shown in FIG. 2.

The optical circuit 17' may, e.g., the optical circuit of a conventional Mach-Zehnder optical modulator.

One or both of the first and second internal optical waveguides 16a', 16b' includes a segment that extends along and near to a corresponding segment of the one of the one or more traveling-wave modulation electrodes 18' in a spatially local, electrical waveguide-to-optical waveguide, coupling region CR. In the coupling region CR, the corresponding segments of one or both of the optical waveguides 16a', 16b' and the one of the one or more traveling-wave modulation electrodes 18' are electro-optically coupled. One or both of the internal optical waveguides 16a', 16b' typically include(s) electro-optically responsive material in the optical core(s) and/or optical cladding(s) thereof to enable such an electro-optical coupling. Due to the electrical waveguide-to-optical waveguide, coupling region CR, the one ore more traveling-wave modulation electrodes 18' can modulate the optical properties of one or both of the internal optical waveguide 16a', 16b' in a directionally dependent manner.

Each of the one or more traveling-wave modulation electrodes 18' also electrically connects, at a first end 28' thereof, e.g., via a wire or capacitive connection, to an electrical output of the AC electrical driver 14'. At a second end 30', each traveling-wave modulation electrode 18' also electrically connects to an electrical termination 31', e.g., a matched termination or a matched ground connection. Thus, when the AC electrical driver 14' applies an alternating voltage signal to the first end 28' of that traveling-wave modulation electrode 18', the alternating voltage signal produces an electrical current wave that propagates from the first end 28' to second end 30' without being significantly reflected at the second end 30'. Such an electrical current wave typically produces a nearby wave of optical index variations that propagates, i.e., in the same direction, along one or both of the internal optical waveguides 16a', 16b' in the coupling region CR.

The MZ-OM 12' may be or may include, e.g., a conventional optical MZ-OM with one or more travelling-wave modulation electrodes. Such a conventional MZ-OM may be configured to modulate light in one or both internal optical waveguides thereof, e.g., via a single-arm operation or via a dual-arm or push-pull operation. In the MZI-OM 12', one or both of the internal optical waveguides 16a', 16b', e.g., may include or be formed substantially of group III-V or group II-VI semiconductor layer(s) and/or lithium niobate.

In each coupling region CR of the MZ-OM 12', the modulation of light in the internal optical waveguide 16a', 16b' depends on whether the light co-propagates or counter-propagates with the electrical current waves on the traveling-wave modulation electrode(s) 18'. In the MZ-OM 12', light propagating from the first external optical port 20 towards the second external optical port 22 is defined to counter-propagate with such electrical current waves, and light propagating from the second external optical port 22 towards the first external optical port 20 is defined to co-propagate with such electrical current waves. The active optical isolator 10' is configured to strongly attenuate light in a preset or selected wavelength range if the light co-propagates with such electrical current waves in the MZ-OM 12' and to much more weakly attenuate light in the preset or selected wavelength range, if the light counter-propagates with electrical current waves therein. In each internal optical waveguide 16a', 16b', some light may be propagating in one direction while other light is simultaneously propagating in the opposite direction.

The AC electrical driver 14' is configured to apply an alternating voltage to the first end(s) 28' of the one or more traveling-wave modulation electrodes 18' such that the MZ-OM 12' has a propagation-direction dependent attenuation. The alternating voltage causes light that co-propagates with the electrical current waves to accumulate a relative phase while traveling over the first and second internal optical waveguides 16a', 16b'. The accumulated relative phase of such co-propagating light is typically about $(2M+1)\pi$ radians where M is an integer. The alternating voltage causes light that counter-propagates with the electrical current waves to either not accumulate a relative phase while traveling over the first and second internal optical waveguides 16a', 16b' or to accumulate a relative phase of about $(2N)\pi$ radians while traveling there over. Here, N is an integer. Due to the different accumulated relative phases, interference in the 1×2 optical power splitter 24' will typically much more strongly attenuate light than will interference in the 2×1 optical power combiner 26'. In addition, the counter-propagating light will typically be attenuated by the MZ-OM 12' in an approximately time-independent manner. Thus, the MZ-OM 12' will substantially pass light, which is received at the first external optical port 20 and will substantially block light, which is received at the second external optical port 22.

Interfering light beams of same intensity typically produces interfered light whose power varies approximately as $\cos^2(\phi/2)$ where $\phi$ is the relative phase between the two light beams being interfered. This fact enables an estimation of acceptable deviations of the relative phase, which co-propagating light accumulates by traversing the internal optical waveguides 16a', 16b', from $(2M+1)\pi$ radians. Indeed, embodiments of the active optical isolator 12' may operate advantageously if the ratio of their optical attenuation in the substantial blocking direction over their attenuation in substantial passing direction is not more than 0.25, preferably is not more than 0.05, and more preferably is not more than 0.01. For such values of this ratio, the AC electrical driver 14' should be configured to cause the accumulated relative phase $\phi$ between co-propagating light traveling over the internal optical waveguides 16a', 16b' to be in the range of $(2M+1)\pi \pm \pi/3$ radians, preferably to be in the range of $(2M+1)\pi \pm 0.68$ radians, and more preferably to be in the range $(2M+1)\pi \pm 0.22$ radians.

Figure 3:
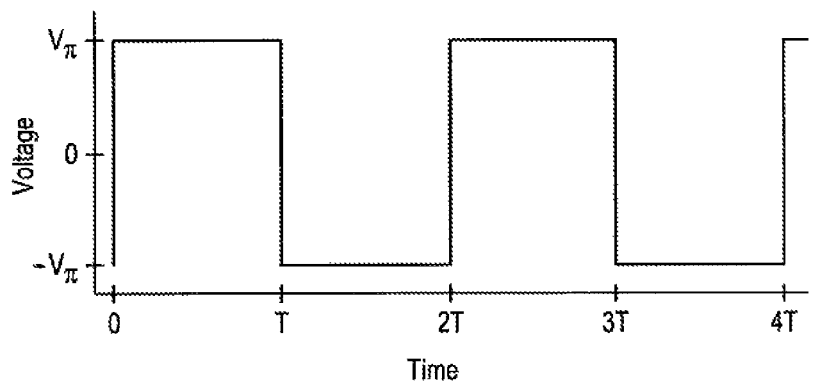
FIG. 3 shows an example of an alternating drive voltage that may be used to operate the active optical isolator of FIG. 2.

FIG. 3 shows an example alternating voltage that may be applied, by the AC electrical driver 14' of FIG. 2, to the one or more traveling-wave modulation electrodes 18' of the active optical isolator 10' of FIG. 2. An example of the type of light modulation, which is expected from the controllable MZ-OM 12' when driven by the example alternating voltage, is schematically illustrated in FIG. 4.

FIG. 3 plots the example alternating voltage as a function of time. The example alternating voltage is suitable, e.g., if the velocities of the light and the electrical current wave match or approximately match in the MZ-OM 12'. The traveling-wave electrode(s) 18' may often be designed to provide such an approximate match of these velocities, e.g., as described below.

In FIG. 3, the example alternating voltage is approximately a square wave whose maximum and minimum values are $V\pi$ and $-V\pi$, respectively, and whose period is 2T. Here, $V\pi$ is a drive voltage that causes an accumulated relative phase of $\pi$ between light that propagates over the first and second internal optical waveguides 16a', 16b' when the light co-propagates with the square wave on the traveling-wave modulation electrode(s) 18'. Here, 2T is the period of said square wave and is the time for light to traverse the coupling region CR between the one or more traveling-wave modulation electrodes 18' and the internal optical waveguide(s) 16a', 16b'. Thus, 2T is the modulation period for light propagating in either direction in the MZ-OM 12'.

Figure 4:
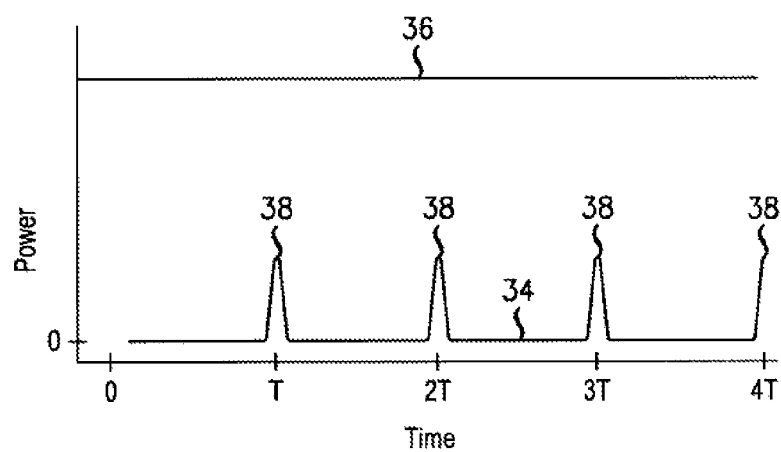
FIG. 4 schematically illustrates an example set of output powers that may be expected to be produced when the MZ-OM of FIG. 2 is driven with the example alternating drive voltage of FIG. 3.

FIG. 4 schematically illustrates expected output powers 34, 36 from the MZ-OM 12' of FIG. 2 for co-propagating and counter-propagating light, when the MZ-OM 12' is driven with the example current wave of FIG. 3. The co-propagating light and the counter-propagating light are produced by receiving light of the same power at the respective second and first external optical ports 22, 20 of the MZ-OM 12'.

The plot 34 schematically illustrates the expected output power at the first external optical port 20 for light co-propagating with the operating electrical current waves in the MZ-OM 12'. The plot 34 illustrates that such co-propagating light is strongly attenuated by the MZ-OM 12' at most times. The plot 34 also has a series of narrow power peaks 38 of higher power, which are separated temporally by approximately T, i.e., about ½ of the period of the driving alternating voltage. The low power portions of the plot 34 correspond to light laterally co-propagating with portions of the operating electrical current waves corresponding to applied voltages of $\pm V\pi$. For such applied voltages, the MZ-OM 12' causes such co-propagating light to accumulate a relative phase of about $\pi$ while traveling over the two internal optical waveguides 16a', 16b'. Due to this relative phase, the light completely or almost completely destructively interferes in the 1×2 optical power splitter 24'. The narrow power peaks 38 of the plot 34 correspond to light laterally co-propagated with portions of the electrical current waves corresponding to applied voltages between $+V\pi$ and $-V\pi$. Such voltages occur in the temporally narrow, transition regions of the approximately square wave of FIG. 3. For these drive voltages, the MZ-OM 12' causes such co-propagating light to accumulate relative phases of smaller magnitude than $\pi$ while traveling over the internal optical waveguides 16a', 16b'. The lower magnitude relative phases cause, at most, partial destructive interference of such light in the 1×2 optical power splitter 24' thereby leading to the output power peaks 38 on the plot 34.

The plot 36 schematically illustrates the expected output power from the second external optical port 26' for light counter-propagating with the operating electrical current waves in the MZ-OM 12'. The plot 36 illustrates that the MZ-OM's processing of such counter-propagating light results in a much larger and approximately time-invariant output power, i.e., much less optical attenuation. While traveling through the coupling region CR, the counter-propagating light accumulates a relative phase that is a time average over the time 2T of the spatially local modulation in the coupling region CR. Since the operating electrical current wave has the same period 2T and is produced by a symmetric alternating voltage, this time average vanishes. Thus, the counter-propagating light accumulates no relative phase or almost no relative by traversing the internal optical waveguides 16a', 16b'. Thus, such light constructively interferes in the 2×1 optical power combiner 26' to produce the relatively higher output power of the plot 36. Counter-propagating light undergoes a much lower optical attenuation than co-propagating light in the MZ-OM12' when driven by a temporally repeating, symmetric AC drive voltage of period 2T.

In the active optical isolators 12, 12' of FIGS. 1 and 2, the operating electrical current waves on the one or more traveling-wave modulation electrodes 18, 18' may have a first velocity $C_{EC}$ and light of the preset or selected wavelength range in the internal optical waveguides 16, 16a', 16b' may have a different second velocity $C_L$. Similarly, the times for light and/or current waves to pass through the coupling regions CR, i.e., the optical phase shifters, may be equal to or differ from an integer multiple of 2T, i.e., the period of the driving voltage.

If the propagation velocity $C_{EC}$ of such electrical current waves differs from the propagation velocity $C_L$ of light in the MZ-OM 12', the AC electrical driver 12' may still be configured to apply a square wave voltage of +Vπ and −Vπ to the end 28' of each traveling-wave modulation electrodes 18'. For light co-propagating with the electrical current wave(s), such an alternating drive voltage still caused the light to typically accumulate a relative phase of π or −π while crossing the coupling region(s) CR of the internal optical waveguides 16a', 16b'. Thus, such co-propagating light will typically destructively interfere in the optical power splitter 24'. For light counter-propagating with the electrical current wave(s), the alternating driving voltage should typically be further constrained so that this light accumulates a relative phase of smaller or vanishing magnitude, i.e., modulo 2Nπ, when traveling through the coupling region CR in the internal optical waveguides 16a', 16b'. For example, the AC electrical driver 14' may be configured to output the alternating voltage with a period 2T satisfying:

$$L/[C_{EC}+C_L]=2nT.$$

Here, L is the length of the coupling region CR between the internal optical waveguide(s) 16a', 16b' and the one or more traveling-wave modulation electrodes 18', and n is an integer. Such a selection for the period 2T will cause the counter-propagating light to accumulate relative phases of about 2Nπ while propagating through the internal optical waveguides 16a', 16b' so that such light constructively interferes in the 2×1 optical power combiner 26'.

FIG. 5 illustrates a method of operating a controllable optical interferometer as an active optical isolator, e.g., to operate the controllable optical interferometers 12, 12' of FIGS. 1 and 2 or to operate a controllable optical loop interferometer. The controllable optical interferometer has one or more traveling-wave modulation electrodes operable to control optical interference therein, e.g., the traveling-wave modulation electrodes 18, 18' of FIGS. 1 and 2. The optical interferometer has first and second external optical ports, e.g., the external optical ports 20, 22 of FIGS. 1 and 2.

The method 50 includes applying a voltage having a periodic modulation to one or more of the traveling-wave modulation electrodes to configure the controllable optical interferometer to substantially block light, which is received at the second external optical port, from being output by the optical interferometer at the first external optical port (step 52). For example, the voltage may have a modulation that causes an alteration of the voltage's sign in a periodic manner. The applying step 52 may also, e.g., configure the controllable optical interferometer to substantially cause light, which is received at the first external optical port, to be output at the second external optical port.

The applied voltage may have, e.g., a square-wave modulation, e.g., at a radio frequency.

The period of the applied voltage may be about equal to the time for the light to cross the coupling region with the traveling-wave modulation electrode(s) or an integral multiple thereof.

The method 50 may further include receiving light at the second external optical port while performing the applying step 52, e.g., receiving light at the second external optical port 22 of FIGS. 1 and 2 (step 54). Typically, the applied voltage produces electrical current wave(s) that co-propagate with some light received from the second external optical port, in a local coupling region. Such light is phase modulated to destructively interfere, in the controllable optical interferometer, with other light received at the second external optical port and thus, is substantially blocked from being output at the first external optical port. The substantial blocking may allow temporally narrow portions of the light, which is received at the second external optical port, to be output at the first external optical port. Each such temporally narrow portion approximately corresponds, in time and temporal width, to one of the narrow transition regions of the applied voltage.

The method 50 may further include receiving light at the first external optical port while performing the applying step 52, e.g., receiving the light at the first external optical port 20 of FIGS. 1-2 (step 56). The applied voltage may cause the controllable optical interferometer to attenuate light received at the first external optical port less than light received at the second external optical port, e.g., at least, 6 decibels less, preferably, at least, 10 decibels less, and more preferably at least 20 decibels less. Thus, the light, which is received at the first external optical port in the step 56, is substantially output by the controllable optical interferometer at the second external optical port.

Figure 6:
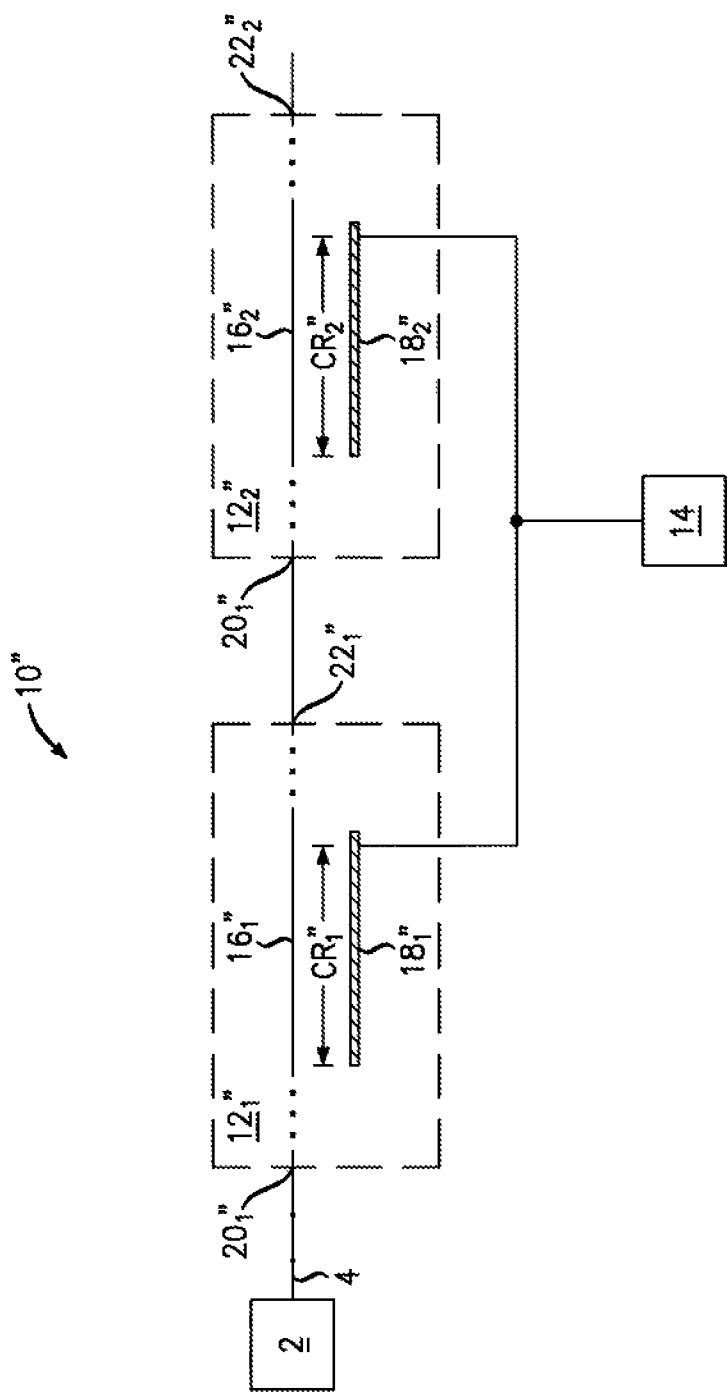
FIG. 6 schematically illustrates an embodiment of an active optical isolator that serially cascades two controllable optical interferometers, e.g., controllable optical interferometers of the type schematically illustrated in FIGS. 1 and/or 2.

FIG. 6 schematically illustrates one embodiment 10" of the active optical isolator 10 of FIG. 1. The active optical isolator 10" includes first and second controllable optical interferometer $12_1$", $12_2$", which are serially cascaded. The active optical isolator 10" also includes the electrical driver 14, which is configured and connected to apply an alternating voltage to the first and second optical interferometers $12_1$", $12_2$" in parallel.

Each of the first and second optical interferometers $12_1$", $12_2$" is constructed like the optical interferometer 12 of FIG. 1. For example, each of the optical interferometers $12_1$", $12_2$" has first and second external optical ports $20_1$", $20_2$", $22_1$", $22_2$"; an internal optical waveguide $16_1$", $16_2$"; and a traveling-wave modulation electrode $18_1$", $18_2$". In spatially local, coupling regions $CR_1$", $CR_2$", the internal optical waveguides $16_1$", $16_2$" and the traveling-wave modulation electrodes $18_1$", $18_2$" are electro-optically coupled, i.e., in electro-optical, traveling wave, phase shifters.

In FIG. 6, the serial cascading directly connects the second external optical port $22_1$" of the first controllable optical interferometer $12_1$" to the first external optical port $20_2$" of the second controllable optical interferometer $12_2$". Thus, light propagating from the second external optical port $22_2$" of the second controllable optical interferometer $12_2$" towards the first external optical port $20_1$" of the first controllable optical interferometer $12_1$" is serially substantially blocked by both the first and the second optical interferometers $12_1$", $12_2$". Thus, the active optical isolator 10" provides an improved optical isolation of the active optical component 2 from optical feedback by light received at the output optical port, i.e., the right-most second external optical port $22_2$".

In some embodiments of the active optical isolator 10", the two controllable optical interferometers $12_1$", $12_2$" may be driven by separate electrical drivers (not shown in FIG. 6).

As illustrated in FIGS. 1, 2, and 6, some embodiments may include an active optical element 2 whose optical output 4 is connected to the adjacent first external optical port 20, $20_1$" of the active optical isolator 10, 10', 10". The active optical element 2 may be, e.g., a laser, an optical amplifier, an optical data modulator, an optically pumpable device, or a light-sensitive device such as a light emitting diode. For example, the active element 2 may be a distributed feedback laser whose optical output 4 externally connects via the active optical isolator 10, 10', 10". In such an embodiment, the active optical isolator 10, 10', 10" may further stabilize the laser or other active optical component by providing isolation of the laser from the optical feedback of external light.

Figure 7:
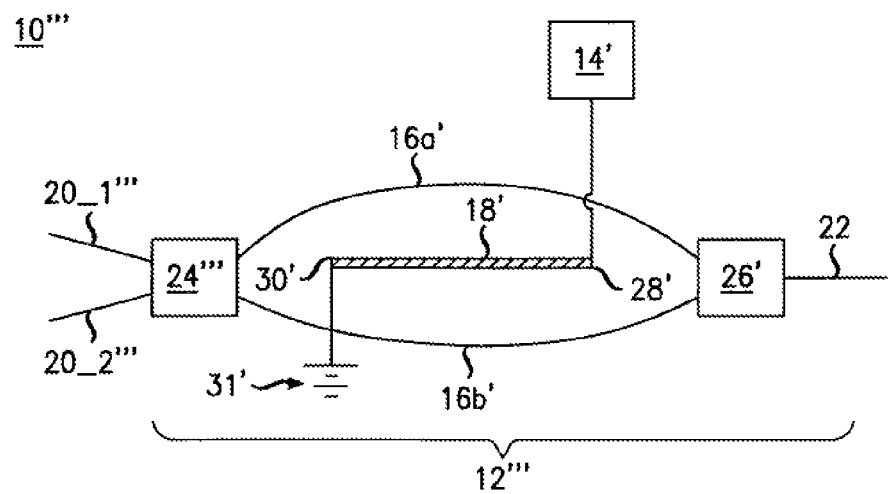
FIG. 7 is a block diagram schematically illustrating a first embodiment of an optical circulator that includes the active optical isolator of FIG. 2.
Figure 8:
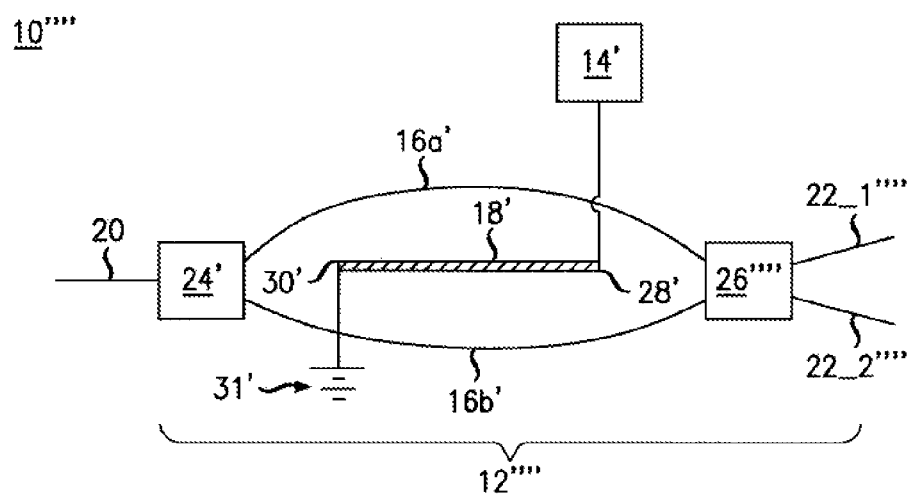
FIG. 8 is a block diagram schematically illustrating a second embodiment of an optical circulator that includes the active optical isolator of FIG. 2.

FIGS. 7 and 8 schematically illustrate 3-port active optical circulators 10''', 10'''' that are embodiments of the active optical isolator 10' of FIG. 2. The active optical circulator 10''' of FIG. 7 includes a MZ-OM 12''' with a 2×2 optical power coupler 24''', which is a specific embodiment of the 1×2 optical power splitter 24' of FIG. 2. The MZ-OM 12''' also includes the 1×2 optical power combiner 26' of FIG. 2. The active optical isolator 10'''' of FIG. 8 includes a MZ-OM 12'''' with a 2×2 optical power coupler 26'''', which is a specific embodiment of the 1×2 optical power combiner 26' of FIG. 2. The MZ-OM 12'''' also includes the 1×2 optical power splitter 24' of FIG. 2. Both MZ-OMs 12''', 12'''' of FIGS. 7 and 8 include the internal optical waveguides 16a', 16b', the one or more traveling-wave modulation electrodes 18', and the electrical termination 31' of the MZ-OM 12' of FIG. 2. Finally, both active optical circulators 10''', 10'''' include the electrical driver 14' of FIG. 2.

In FIGS. 7 and 8, the electrical drivers 14' are configured to operate the traveling-wave modulation electrodes 18' such that the MZ-OMs 12''', 12'''' operate as active optical circulators. In particular, the traveling-wave modulation electrodes 18' are driven to have electrical current waves thereon, which cause co-propagating light, i.e., light received at the second external optical ports 22, 22_1'''', to accumulate relative phases of about $\pi$ by propagating over the first and second internal optical waveguides 16a', 16b'.

In FIG. 7, the 2×2 optical power coupler 24''' adds another relative phase to some light, which is received from the internal optical waveguides 16a', 16b' and is interfered therein. In particular, the 2×2 optical power coupler 24''' adds another relative phase of about $\pi$ to light interfered therein and output at one of the first external optical ports 20_2''', but does not add such an extra relative phase to the light interfered therein and output at the other of the first external optical ports 20_1'''. Thus, the 2×2 optical power coupler 24''' outputs to the first of the first external optical ports 20_1''' substantially destructively interfered light and outputs to the second of the first external optical ports 20_2''' substantially constructively interfered light. In addition, the 2×2 optical power coupler 24''' adds an extra relative phase of about $\pi$ to the light that is received at the second of the first optical ports 20_2''' and is output to the first and second internal optical waveguides 16a', 16b'. For that reason, such light is destructively interfered in the 1×2 optical power combiner 26' and is not substantially output to the second external optical port 22.

For the above operation, the MZ-OM 12''' is operated as an optical circulator for the following reasons. First, the MZ-OM 12''' outputs light, which is received at the first of the first external optical ports 20_1''', at the second external optical port 22, but does not output light, which is received at the second external optical port 22, at the first of the first external optical ports 20_1'''. Second, the MZ-OM 12''' outputs light, which is received at the second external optical port 22, at the second of the first external optical ports 20_2''', but does not output light, which is received at the second of the first external optical ports 20_2''', at the second external optical port 22. For these reasons, the active optical circulator 10''' circulates, in a substantially unidirectional sense, light from the first of the first external optical ports 20_1''' to the second external optical port 22 and circulates, in a substantially unidirectional sense, light from the second external optical port 22 to the second of the first external optical ports 20_2'''.

In FIG. 8, the 2×2 optical power coupler 26'''' adds another relative phase to some light, which is received from the internal optical waveguides 16a', 16b' and interfered therein. In particular, the 2×2 optical power coupler 26'''' adds a relative phase of about $\pi$ to light interfered therein and transmitted to the second of the second external optical ports 22_2'''', but does not add such an extra relative phase to the light interfered therein and output at the first of the second external optical ports 22_1''''. Thus, the 2×2 optical power coupler 26'''' outputs to the first of the second external optical ports 22_1'''' substantially constructively interfered light and outputs to the second of the second external optical ports 22_2'''' substantially destructively interfered light. For that reason, light, which is received at the first of the second optical ports 22_1'''', is destructively interfered in the 1×2 optical power splitter 24' and is not substantially output at the first external optical port 20.

For the above operation, the MZ-OM 12'''' operates as a 3-port optical circulator for the following reasons. First, the MZ-OM 12'''' outputs light, which is received at the first external optical port 20, at the first of the second external optical ports 22_1'''', but does not substantially output light, which is received at the first of the second external optical ports 22_1'''', at the first external optical port 20. Second, the MZ-OM 12'''' outputs light, which is received at the second of the second external optical ports 22_2'''', at the first external optical port 20, but does not output light, which is received at the first external optical port 20, at the second of the second external optical ports 22_2''''. Thus, the active optical circulator 10'''' circulates, in a substantially unidirectional sense, light from the second of second external optical ports 22_2'''' to the first external optical port 20 and circulates, in a substantially unidirectional sense, light from the first external optical port 20 to the first of the second external optical ports 22_1''''.

In some embodiments, the controllable optical interferometers 12, 12', 12", 12''', 12'''', of FIGS. 1, 2, 6, 7, and 8, the coupling regions CR, $CR_1"$, $CR_2"$ between the traveling-wave modulation electrode(s) 18', 18_1", 18_2" and the internal optical waveguide(s) 16, 16a', 16b' may be formed by a series of separate and spatially local, coupling regions. In such cases, the individual coupling regions of the series are separated by passive regions without significant electro-optical coupling, i.e., not shown in FIGS. 1, 2, 6, 7, and 8.

Figure 9:
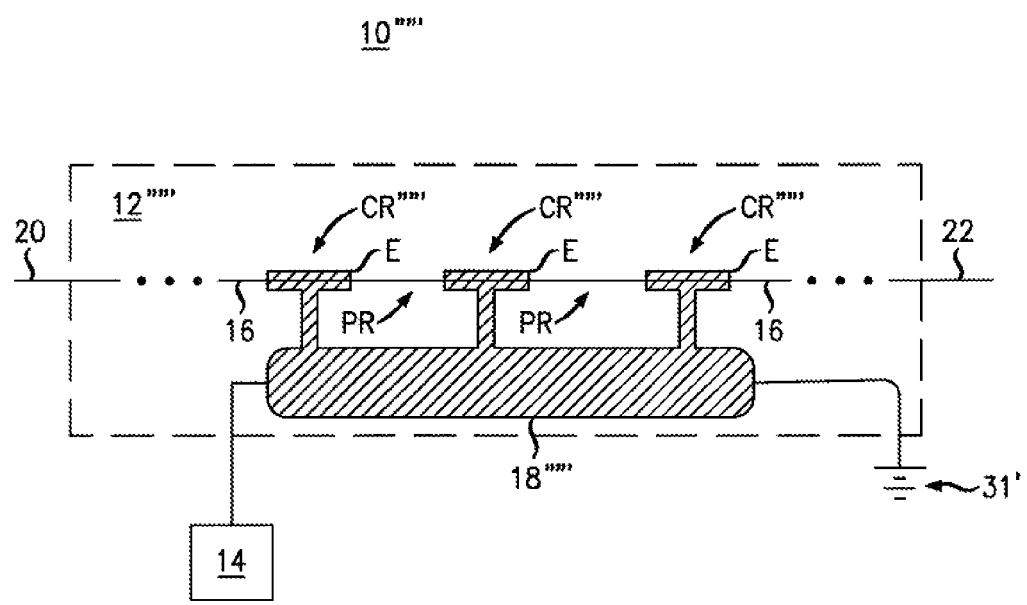
FIG. 9 is a schematic top view of an integrated optical embodiment of the active optical isolator of FIG. 1 that includes a sequence of spatially separated coupling regions between a traveling-wave modulation electrode and an internal optical waveguide therein.

As an example, FIG. 9 schematically illustrates such an embodiment 10''''' of the active optical isolator 10 of FIG. 1 in which the controllable optical interferometer 12''''' has a special traveling-wave modulation electrode 18''''' that is operated by the electrical driver 14. The traveling-wave modulation electrode 18''''' is formed to provide a sequence of spatially separated, electro-optical coupling regions CR''''' with the internal optical waveguide 16. In particular, the traveling-wave modulation electrode 18''''' has extensions E, and each extension E vertically overlaps an individual segment of the internal optical waveguide 16 thereby forming the three illustrated coupling regions CR'''''. Of course, the number of such individual coupling regions CR''''' may vary in different embodiments. Adjacent ones of the coupling regions CR''''' are separated by passive regions PR where the traveling-wave modulation electrode 18''''' is more distant from the internal optical waveguide 16. For such a construction, operating electrical current waves on the traveling-wave modulation electrode 18'''' can modulate the optical refractive index of the internal optical waveguide 16 in the individual coupling regions CR'''', but do not substantially modulate the optical refractive index of the internal optical waveguide 16 in the passive regions PR. In some embodiments, the traveling-wave modulation electrode 18'''' may be constructed so that electrical current waves thereon are approximately in phase with light propagating in the internal optical waveguide 16 in each of the individual coupling regions CR''''. In some such embodiments, the propagation velocity of light on the internal optical waveguide 16 may, e.g., not be matched to the propagation velocity of electrical current waves on the traveling-wave modulation electrode 18''''.

U.S. Patent Publication No. 2014/0153860 may provide constructions of traveling-wave modulation electrodes and internal optical waveguides that have a sequence of spatially separated, individual electro-optical coupling regions. Some such constructions may be suitable for use in some examples of the controllable optical interferometers 12, 12', $12_1$'', $12_2$'', 12''', 12'''', 12''''' of FIGS. 1, 2, 6, 7, 8, and/or 9. U.S. Patent Publication No. 2014/0153860 is incorporated herein by reference in its entirety.

Herein, various embodiments of active optical isolators, e.g., the active optical isolators 10, 10', 10'' 10''', 10'''', 10''''' of FIGS. 1, 2, 6, 7, 8 and 9, are configured to substantially pass light between one or more pairs (20, 22), (20_1''', 22), (20_2''', 22), (20, 22_1''''), (20, 22_2'''') of external optical ports, in one direction, and substantially block light between the same pairs of external optical ports, in the opposite direction. In different such embodiments, the difference between the attenuation of light in the substantially blocking direction and the attenuation of light in the substantially passing direction may vary widely. For example, in such an optical isolator, the magnitude of the difference of these directional attenuations, in decibels, may be 6 or more, 10 or more, or even 20 or more. Different applications may advantageously use examples of the optical isolators 10, 10', 10''', 10'''', 10''''' that provide such widely varying qualities of optical isolation.

Herein, the various embodiments of active optical isolators are intended to include controllable optical interferometers, which are electrically connected to and driven by various types of electrical drivers. Indeed, such an electrical driver may produce any alternating voltage suitable for driving the connected controllable optical interferometer to function as an optical isolator.

The Detailed Description of the Illustrative Embodiments and the Drawings merely illustrate the principles of the invention. It will thus be appreciated that those skilled in the art will be able to devise various arrangements that, although not explicitly described or shown herein, embody the principles of the inventions and are included within the claimed inventions. Furthermore, all examples recited herein are principally intended to be only for pedagogical purposes to aid in understanding the principles of the inventions and concepts contributed by the inventor to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus, comprising:
a controllable optical interferometer having first and second external optical ports and one or more traveling-wave modulation electrodes; and
an electrical driver configured and connected to apply a voltage with a periodic modulation to the one or more traveling-wave modulation electrodes such that the controllable optical interferometer operates as an optical isolator over a wavelength range; and
wherein the controllable optical interferometer includes a Mach-Zehnder optical interferometer having first and second internal optical paths, in parallel, connecting the first external optical port to the second external optical port; and
wherein the electrical driver is configured to operate the controllable optical interferometer such that light substantially co-propagating on the internal optical paths with electrical current waves on the one or more traveling-wave modulation electrodes is more attenuated than light substantially counter-propagating on the internal optical paths with the electrical current waves on the one or more traveling-wave modulation electrodes.

2. An apparatus, comprising:
a controllable optical interferometer having first and second external optical ports and a traveling-wave modulation electrode; and
an electrical driver configured and connected to apply a voltage with a periodic modulation to the traveling-wave modulation electrode such that the controllable optical interferometer operates as an optical isolator over a wavelength range; and
wherein the controllable optical interferometer includes an optical loop interferometer.

3. The apparatus of claim 1, wherein the controllable optical interferometer includes a series of cascaded controllable optical interferometers, each of the controllable optical interferometers of the series having a traveling-wave modulation electrode; and
wherein an electrical driver is configured to apply a voltage with a periodic modulation to the traveling-wave modulation electrode of each of the cascaded controllable optical interferometers.

4. The apparatus of claim 1, wherein the electrical driver is configured to operate the controllable optical interferometer such that, in a wavelength range, light input to the second external optical port is substantially blocked by the controllable optical interferometer from being output at the first external optical port.

5. The apparatus of claim 4, wherein the electrical driver is configured to operate the controllable optical interferometer such that, in the wavelength range, light input to the first external optical port is substantially passed by the controllable optical interferometer to be output at the second external optical port.

6. The apparatus of claim 1, wherein the electrical driver is configured to operate the controllable optical interferometer such that, in the wavelength range, light input to the first external optical port is substantially passed by the controllable optical interferometer to be output at the second external optical port.

7. The apparatus of claim 1, wherein the voltage has a square wave modulation.

8. The apparatus of claim 1, wherein the controllable optical interferometer is an integrated optical device.

9. The apparatus of claim 1, further comprising:
a laser having distributed optical feedback; and
wherein the controllable optical interferometer is connected to receive light from the laser via one of the external optical ports and is connected to function as an optical isolator for the laser.

10. The apparatus of claim 1, further comprising:
an optical amplifier; and
wherein the controllable optical interferometer is connected to receive light from the optical amplifier via one of the external optical ports and is connected to function as an optical isolator for the optical amplifier.

11. The apparatus of claim 1, wherein the controllable optical interferometer has a third external optical port; and
wherein the voltage is configured to operate the controllable optical interferometer as an optical circulator with the first, second and third external optical ports.

12. A method, comprising:
applying a voltage having a periodic modulation to one or more traveling-wave modulation electrodes of a controllable optical interferometer with first and second external optical ports to configure the controllable optical interferometer to substantially block light received at the second external optical port from being output by the controllable optical interferometer at the first external optical port; and
wherein the controllable optical interferometer is a Mach-Zehnder optical interferometer having a pair of internal optical paths, in parallel, connecting the first external optical port to the second external optical port; and
wherein the applying is configured to cause light substantially co-propagating on the internal optical paths with electrical current waves on the one or more traveling-wave modulation electrodes to be more attenuated than light substantially counter-propagating on the internal optical paths with the electrical current waves on the one or more traveling-wave modulation electrodes.

13. The method of claim 12, wherein the applying an alternating voltage configures the controllable optical interferometer to cause light received at the first external optical port to be substantially output by the controllable optical interferometer at the second external optical port.

14. The method of claim 12, wherein the applying applies a voltage with a square wave modulation to the one or more traveling-wave modulation electrodes.

15. The method of claim 12, wherein the applying produces a current wave on a segment of the one or more traveling-wave modulation electrodes light that co-propagates with part of the light received at the second external optical port in a coupling region such that the light received at the second external optical port is substantially blocked from being output at the first external optical port.

16. A method, comprising:
applying a voltage having a periodic modulation to a traveling-wave modulation electrode of a controllable optical interferometer with first and second external optical ports to configure the controllable optical interferometer to substantially block light received at the second external optical port from being output by the controllable optical interferometer at the first external optical port; and
wherein the controllable optical interferometer is an optical loop interferometer.

17. The method of claim 12, further comprising:
receiving light from a laser or optical amplifier at the first external optical port while performing the applying.

18. The method of claim 12, wherein the applying a voltage configures the controllable optical interferometer to function as a 3-port optical circulator.

19. The apparatus of claim 2, wherein the controllable optical interferometer has a third external optical port; and
wherein the voltage is configured to operate the controllable optical interferometer as an optical circulator with the first, second and third external optical ports.

20. The apparatus of claim 2, wherein the controllable optical interferometer includes a series of cascaded controllable optical interferometers, each of the controllable optical interferometers of the series having a traveling-wave modulation electrode, and
wherein an electrical driver is configured to apply a voltage with a periodic modulation to the traveling-wave modulation electrode of each of the cascaded controllable optical interferometers.

21. The apparatus of claim 2, wherein the electrical driver is configured to operate the controllable optical interferometer such that, in a wavelength range, light input to the second external optical port is substantially blocked by the controllable optical interferometer from being output at the first external optical port.

22. The apparatus of claim 21, wherein the electrical driver is configured to operate the controllable optical interferometer such that, in the wavelength range, light input to the first external optical port is substantially passed by the controllable optical interferometer to be output at the second external optical port.

* * * * *